Sept. 28, 1965  A. G. HEWITT ETAL  3,208,661

FLEXIBLE BAG

Filed Oct. 26, 1962

INVENTORS
ALFRED G. HEWITT
HARRY P. EICHIN
BY John F. Hohmann
ATTORNEY

United States Patent Office 3,208,661
Patented Sept. 28, 1965

3,208,661
FLEXIBLE BAG
Alfred G. Hewitt, Stuart, Fla., and Harry P. Eichin, Western Springs, Ill., assignors to Union Carbide Corporation, a corporation of New York
Filed Oct. 26, 1962, Ser. No. 233,258
7 Claims. (Cl. 229—53)

This invention relates generally to flexible bags and, more particularly, to flexible bags having integral filling-pouring spouts.

A package which has been developed heretofore for shipping and dispensing liquid, pasty, or pulverulent materials uses a plastic liner interior to a corrugated paperboard container. The liner for this package is made of thermoplastic film which is folded and sealed to form a closed bag. Resistance to stress fatigue of the liner at the liquid level line is provided by making the wall of the liner of a plurality of plies of thermoplastic film. In such a construction, the innermost ply is made of tubular film, and the outer plies are made of sheet film sealed to the inner tube. In order to fill and empty the bag, a rubber tube is usually inserted and sealed into one corner thereof. However, because of the tendency of the plastic film to block, it is difficult to open a passage provided in the sealed liner for inserting the filling tube therein. Also, when a multiwall liner is used, an operator may inadvertently place the filling tube between the inner and outer plies of the liner. When such a bag is later filled with liquid, it is thus used as a single-wall liner and frequently breaks in shipping.

It is, therefore, the main object of the present invention to provide a flexible bag with an integral filling-pouring spout.

Other aims and advantages of the invention will be apparent from the following description and appended claims.

In accordance with the present invention, there is provided a bag comprising a flattened flexible tube, a first end of the tube being slit transversely to form a flap thereon, the flap being spirally wound so as to form a tubular spout opening into the tube, the adjacent layers of the spout being sealed together, the first end of the tube being sealed transversely from the spout, and the second end of the tube being sealed transversely and coextensive to the folded edges of the flattened tube.

The flexible tube is preferably a seamless tube of thermoplastic film which is readily heat sealable. However, this invention is equally applicable to other flexible materials, such as paper or metal foil for example, and to combinations of these materials in the form of coatings, laminates, or multilayers. Also, the invention is not limited to seamless tubes but is applicable to tubes formed, for example, by rolling and seaming sheet material.

For simplicity of explanation and understanding, the seals will be hereinafter illustrated as heat seals made by a conventional bar sealer. It is, of course, within the spirit and scope of this invention to utilize other sealing means, such as ultrasonics, radio frequency heating, infrared heating, glues, solvent adhesives, and the like.

The invention will be more particularly described with reference to the accompanying drawings.

Figure 2:
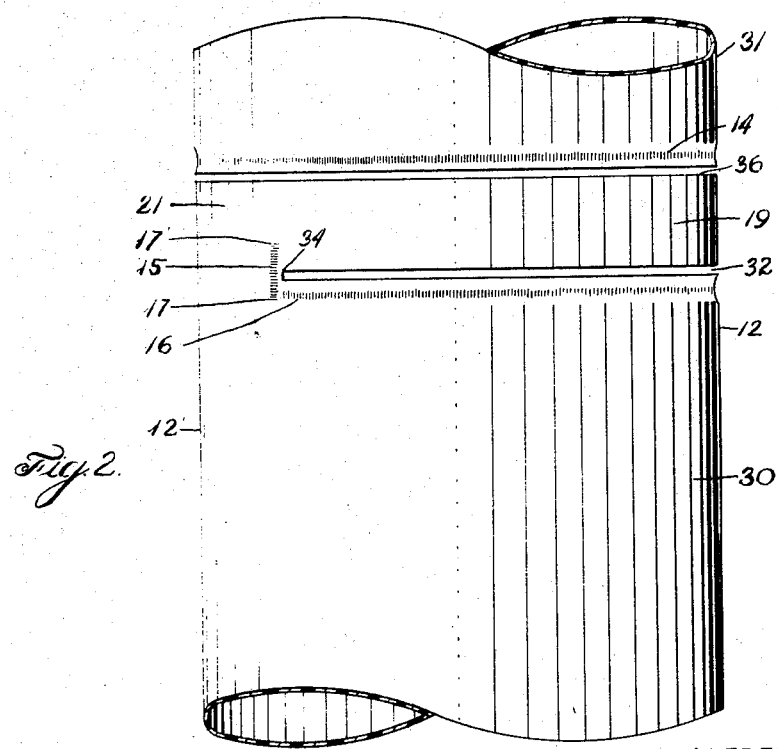
FIG. 2 is a plan view illustrating the first step in the formation of the seals and spout.

Referring first to FIG. 2, which illustrates the first step in fabricating the bag of this invention, a parent flattened thermoplastic tubing 30 having folded edges 12 and 12' is intermittently advanced from a supply roll to sealing and cutting and tube-forming stations by conventional means not shown. The tubing 30 is typically a seamless polyethylene tubing 0.003 inch thick with a flat width of 18 inches. At the first station, a heat seal 16 is made in the top of the bag being formed. The heat seal 16 seals together the two walls of the flattened tubing 30 along a line perpendicular to the folded edges and extending across only a major portion of the flat width of the tubing, thus forming a partial closure at that end of the tubing. Simultaneously with the forming of the heat seal 16, a transverse flap cut 32 is made by slitting both plies of the flattened tubing adjacent to and coextensive with the heat seal 16 so as to form a flap 19 which is integral and continuous with the remainder of the tubing 30. In the embodiment shown in the drawings, the flap cut 32 is spaced about ⅛ inch from the heat seal 16, and runs from the edge fold 12 to terminus at a point 34 spaced intermediate the edge folds 12 and 12'. The heat seal 16 runs from the edge fold 12 to a point 17 adjacent the point 34, and a branch heat seal 15 runs from the point 17 parallel to the edge fold 12' to terminus at a point 17' midway of the flap 19, thus providing a passage 21 to the bag interior.

The bag bottom seal 14 and a cut 36 are made at the same station and at the same time by a combination heat-sealing and cutting head. The heat seal 14 is spaced about ⅛" from cut 36 and seals together the two walls of the flattened tubing 30 along a line perpendicular to the folded edges 12 and 12' and extending across the entire flat width of the tubing 30, thus forming a full closure at that end of the tubing. The cut 36 is spaced about 3" from the cut 32 and severs and separates the previously made bag 31 from the parent tubing 30.

Figure 1:
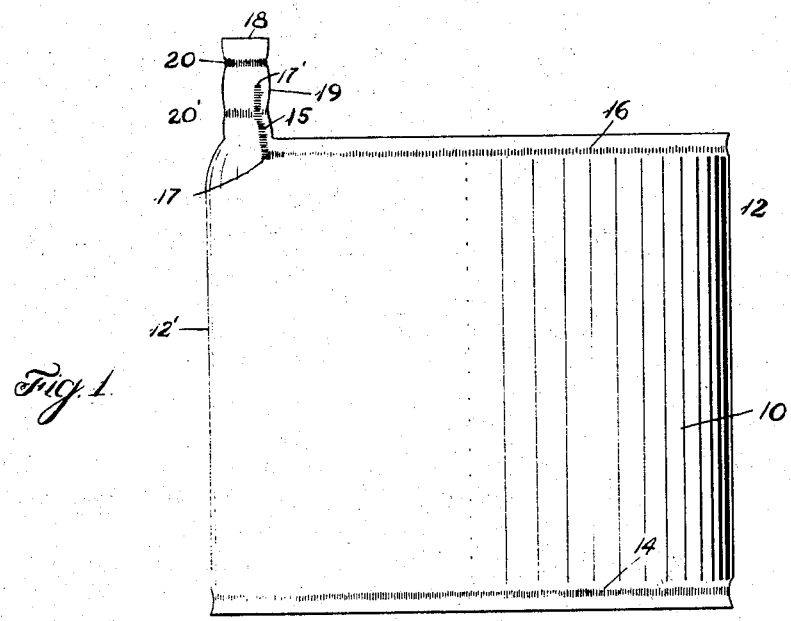
FIG. 1 is a top view of a finished sealed liner bag with an integral spout.

As can be seen in FIG. 1, the finished bag comprises a two-ply body portion 10 bounded by two folded edges 12 and 12', and a full closure formed at one end of the body portion 10 by the heat seal 14 adjoining together the two plies of the body portion between the two edge folds 12 and 12', a partial closure formed at the other end of the body portion 10 by the heat seals 16 and 15 joining together the two plies of the body portion between the two edge folds 12 and 12', and a spout 18 formed by the spirally wound flap 19.

While various specific forms of the present invention have been described herein in some detail, it will be understood that the same are susceptible of numerous modifications. For example, it may be desirable to form more than one spout on the same bag. Also, the location of the spout may be varied, such as by cutting a transverse slit in from each edge to fold to form two flaps which can be spirally wound to form a single central spout.

What is claimed is:

1. A bag comprising a flattened flexible tube, a first end of said tube being slit transversely to form a flap thereon, said flap being spirally wound so as to form a tubular spout opening into said tube, the adjacent layers of said tubular spout being sealed together, said first end of said flattened tube being sealed transversely from said spout, and said second end of said tube being sealed transversely.

2. The bag of claim 1 wherein said flattened flexible tube is a thermoplastic material.

3. The bag of claim 2 wherein said seals are heat seals.

4. A bag comprising:
   (a) a flattened flexible tube having two folded edges;
   (b) a partial closure at a first end of said flattened tube, said partial closure being formed by a seal between the two walls of the flattened tube, said seal extending transversely across only a major portion of the flat width of said tube;

(c) a full closure at the second end of said flattened tube, said full closure being formed by a seal between the two walls of the flattened tube, said seal extending transversely across the entire flat width of said tube; and (d) a flap formed on said first end of said tube by a slit through both walls of said flattened tube adjacent to and coextensive with said partial closure on the side thereof away from said full closure, said flap being spirally wound so as to form a tubular spout opening into said tube, the adjacent layers of said spout being sealed together.

5. A bag comprising: a body section, said body section having three completely closed ends and one partly closed end; a spout section, said spout section constituting an extension of said body portion and being integrally formed with said body section at the open portion of said partly closed end, said spout section having at least one, at least partly sealed lateral edge; and a flap, said flap being an extension of, and integrally formed with, said at least one sealed lateral edge, said flap being in the form of a spiral, wound about said spout section and sealed to said spout section.

6. The bag of claim 5, wherein said spout section has two, at least partly sealed, lateral edges and each lateral edge has a flap extending therefrom and spirally wound said spout section.

7. The bag blank comprising: a flattened flexible tube having an open end and a sealed end, a slit extending transversely across only a major portion of the flat width of said tube adjacent said open end, a seal between the two walls of the flattened tube extending transversely across the flat width of said tube and being at least co-extensive with said slit, said seal being positioned on the side of the said slit toward said sealed end of said flattened tube, and a seal between the two walls of the flattened tubing and extending from the end of the transverse seal which is spaced intermediate the foiled edges of said flattened tube, at least part way toward the open end of said flattened tube.

References Cited by the Examiner
UNITED STATES PATENTS

| | | | |
|---|---|---|---|
| 2,446,308 | 8/48 | Smith | 229—53 |
| 2,660,100 | 11/53 | Doyle | 93—35 |
| 2,955,517 | 10/60 | Honsel | 93—35 |
| 2,998,340 | 8/61 | Conway et al. | |
| 3,004,698 | 10/61 | Ashton | 229—62.5 |
| 3,042,287 | 7/62 | Chandler | 229—62.5 |

FRANKLIN T. GARRETT, *Primary Examiner.*